United States Patent [19]
Grosjean et al.

[11] Patent Number: 5,863,854
[45] Date of Patent: *Jan. 26, 1999

[54] CATALYST SYSTEM FOR OLEFIN POLYMERIZATION AND PROCESS FOR THE POLYMERIZATION OF AT LEAST ONE OLEFIN IN THE PRESENCE OF THIS CATALYST SYSTEM

[75] Inventors: Abel Grosjean, Houston, Tex.; Benoît Koch, Hannut, Belgium

[73] Assignee: Solvay Polyolefins Europe-Belgium (Société Anonyme), Brussels, Belgium

[ * ] Notice: The term of this patent shall not extend beyond the expiration date of Pat. No. 5,807,935.

[21] Appl. No.: 898,467

[22] Filed: Jul. 24, 1997

Related U.S. Application Data

[63] Continuation of Ser. No. 559,307, Nov. 15, 1995, abandoned.

[30] Foreign Application Priority Data

Nov. 16, 1994 [BE] Belgium ............................... 09401024

[51] Int. Cl.$^6$ ...................................................... C08F 4/22
[52] U.S. Cl. ........................... 502/117; 502/111; 502/113; 526/97; 526/105; 526/114; 526/908; 526/348.4; 526/348.5; 526/348.6; 526/352
[58] Field of Search ..................................... 502/111, 113, 502/117; 526/97, 105, 114, 908

[56] References Cited

U.S. PATENT DOCUMENTS

| | | |
|---|---|---|
| 4,359,562 | 11/1982 | Stein et al. . |
| 4,758,544 | 7/1988 | Plesko et al. ............................ 502/208 |
| 4,806,513 | 2/1989 | McDaniel et al. ...................... 502/107 |
| 5,284,811 | 2/1994 | Witt et al. ............................... 502/210 |

FOREIGN PATENT DOCUMENTS

| | | |
|---|---|---|
| 0 045 855 | 2/1982 | European Pat. Off. . |
| 0 166 157 | 1/1986 | European Pat. Off. . |
| 0 188 658 | 7/1986 | European Pat. Off. . |
| 1242530 | 8/1960 | France . |
| 884545 | 12/1961 | United Kingdom . |
| WO94/26790 | 11/1994 | WIPO . |

*Primary Examiner*—David W. Wu
*Attorney, Agent, or Firm*—Venable John W. Schneller

[57] ABSTRACT

A catalyst system for olefin polymerization, including a catalytic solid based on chromium deposited on a support containing silica, alumina and aluminium phosphate and a cocatalyst chosen from organoaluminium compounds. One of the essential characteristics of the invention is the combination of an organoaluminium compound as cocatalyst with a catalytic solid based on chromium deposited on a support containing silica, alumina and aluminium phosphate.

20 Claims, No Drawings

CATALYST SYSTEM FOR OLEFIN POLYMERIZATION AND PROCESS FOR THE POLYMERIZATION OF AT LEAST ONE OLEFIN IN THE PRESENCE OF THIS CATALYST SYSTEM

This application is a continuation, of application Ser. No. 08/559,307, Filed Nov. 15, 1995, now abandoned.

FIELD OF THE INVENTION

The present invention relates to a catalyst system for olefin polymerization, including especially a catalytic solid based on chromium deposited on an in-organic support. It also relates to a process for the polymerization of at least one olefin in the presence of this catalyst system.

TECHNOLOGY REVIEW

Chromium-based olefin polymerization catalysts deposited on an inorganic support are well known, such as, for example, the catalysts described in Patent Application EP-A-0166157. In Example 6 of this patent application ethylene is copolymerized with hexene by means of a mixture of two chromium catalysts, the first one being deposited on a support of alumina treated with Silbond® 40 silicon tetraethylate, and the second one on an aluminium phosphate support. In this copolymerization process triethylborane $(C_2H_5)_3B$ is also employed as cocatalyst.

This known process has the disadvantage of requiring a relatively high comonomer concentration in order to make it possible to lower appreciably the density of the polyethylene.

The present invention overcomes this disadvantage by providing a new catalyst system for the polymerization of olefins, which makes it possible to lower the density of the polyolefins by incorporating therein a small quantity of comonomer or even none at all.

SUMMARY OF THE INVENTION

To this end, the invention relates to a catalyst system for olefin polymerization, including a catalytic solid based on chromium deposited on a support containing silica, alumina and aluminium phosphate and a cocatalyst chosen from organoaluminium compounds.

One of the essential characteristics of the invention is the combination of an organoaluminium compound as cocatalyst with a catalytic solid based on chromium deposited on a support containing silica, alumina and aluminium phosphate.

DETAILED DESCRIPTION OF THE INVENTION

The organoaluminium compound of the catalyst system of the invention is in most cases chosen from the compounds of formula $AlR_{3-n-m}(OR')_nX_m$ in which R and R' are identical or different and each denotes a hydrocarbon radical, X denotes a halogen and n and m denote numbers such that $0 \leq n < 3$ and $0 \leq m < 3$. Examples which may be mentioned of organoaluminium compound that can be employed in the invention are diethylaluminium ethoxide $[(C_2H_5)_2Al(O-C_2H_5)]$, ethylaluminium dichloride $[Al(C_2H_5)Cl_2]$, ethylaluminium sesquichloride $[Al_2(C_2H_5)_3Cl_3]$, diethylaluminium chloride $[Al(C_2H_5)_2Cl]$, trimethylaluminium $[Al(CH_3)_3]$, triisobutylaluminium $[Al(i-C_4H_9)_3]$ and triethylaluminium $[Al(C_2H_5)_3]$.

In the organoaluminium compound of the catalyst system of the invention R and R' are advantageously chosen from hydrocarbon radicals containing up to 20 carbon atoms and preferably up to 6 carbon atoms. Good results are obtained when R and R' are chosen from alkyl (linear or branched), cycloalkyl, arylalkyl, aryl and alkylaryl radicals. The best results are obtained when R denotes a linear or branched alkyl radical. X is generally chosen from fluorine and chlorine. Chlorine is particularly suitable. As a general rule n and m do not exceed 2, in particular do not exceed 1. Preferably, n and m are 0.

The preferred organoaluminium compounds are trimethylaluminium, triisobutylaluminium and triethylaluminum. Triethylaluminium is very particularly preferred.

For the purpose of the present invention an organoaluminium compound is intended to denote one or more of these compounds. However, a single organoaluminum compound is preferred.

Another important characteristic of the invention lies in the composition of the support of the catalytic solid, which simultaneously contains silica, alumina and aluminium phosphate.

The support of the catalytic solid of the invention advantageously has a specific surface of at least 100 $m^2/g$, in particular at least 180 $m^2/g$, values of at least 220 $m^2/g$ being the most favorable ones. In most cases the specific surface is not more than 800 $m^2/g$, more precisely not more than 700 $m^2/g$, values of not more than 650 $m^2/g$ being the most common ones. The specific surface (SS) of the support is measured according to the BET volumetric method of British Standard BS 4359/1 (1984). The support of the catalytic solid of the invention generally has a crystallization temperature of at least 700° C., such as, for example, of at least 1000° C., The crystallization temperature of the support is determined by subjecting a sample of the support to a heat treatment at various temperatures (500° C., 700° C., 800° C., 950° C., 1050° C.) and then, after each heat treatment, by examining this sample by X-ray diffraction.

The support of the catalytic solid of the invention is usually characterized by a pore volume of at least 1.5 $cm^3/g$, more especially of at Least 2 $cm^3/g$, values of at least 2.2 $cm^3/g$ being recommended. The pore volume is generally not more than 5 $cm^3/g$, in particular not more than 4.5 $cm^3/g$, values of not more than 4 $cm^3/g$ being common. The pore volume (PV) is the sum of the pore volume consisting of pores of radius smaller than or equal to 75 Å, measured by the nitrogen penetration (BET) method according to the volumetric technique described in British Standard BS 4359/1 (1984) and of the pore volume measured by the mercury penetration method by means of the porosimeter of Poro 2000 type marketed by Carlo Erba Co, according to Belgian Standard NBN B 05-202 (1976).

Good results can be obtained when the specific surface (SS) and the pore volume (PV) of the support correspond to the following relationship:

$$SS < (PV \times 564 - 358),$$

in which SS and PV are, respectively, the numerical values of the specific surface expressed in $m^2/g$ and of the pore volume expressed in $cm^3/g$.

The support of the catalytic solid according to the invention preferably contains silica (X), alumina (Y) and aluminium phosphate (Z) in a molar percentage (X):(Y):(Z) of (10 to 95):(1 to 80):(1 to 85), and more particularly of (20 to 80):(1 to 60):(5 to 60).

According to a particularly preferred alternative form, besides the silica, the alumina and the aluminium phosphate, the support of the catalytic solid of the invention contains titanium, generally in the form of titanium dioxide. The quantity of titanium present in the support, expressed as molar percentage of $TiO_2$ relative to the support of the catalytic solid containing silica, alumina, aluminium phosphate and titanium dioxide, is generally at least 0.1 mol %, preferably at least 0.5 mol %, values of at least 1 mol % being the most common. The quantity of titanium, expressed as molar percentage of $TiO_2$, in most cases does not exceed 40 mol %, more particularly does not exceed 20 mol %, values of not more than 15 mol % being recommended.

The support according to the invention generally takes the form of a powder whose grains have a diameter of 20 to 200 μm.

The support of the catalytic solid of the invention usually has an apparent specific weight higher than or equal to 50 kg/m$^3$, in particular higher than or equal to 100 kg/m$^3$; it is generally at most 500 kg/m$^3$, typically 300 kg/m$^3$. The apparent specific weight is measured by free flow according to the following procedure: the powder of the support to be analysed is poured into a cylindrical receptacle of 50 cm$^3$ capacity, its tamping being avoided, from a hopper whose lower edge is placed 20 mm above the upper edge of the receptacle. The receptacle a straight slat is then weighed, the tare is subtracted from the weight recorded and the result obtained (expressed in g) is divided by 50.

In addition to the silica, alumina, aluminium phosphate and, if applicable, titanium, the support of the catalytic solid of the invention may optionally contain additional substances. These may be, for example, traces of elements of groups IA and IIA of the Periodic Table, or of metals such as iron. However, these elements must be present in limited quantities, in order not to affect the intrinsic qualities of the catalytic solid.

The support of the catalytic solid of the invention may be obtained by any suitable known means, provided simultaneously containing silica, alumina and aluminium phosphate. A particular process for obtaining the support consists in mixing, in a first stage, an alcohol, water, a silicon alcoholate and an acid in quantities such that the water/silicon molar ratio is from 2 to 50, in adding to the hydrolysis mixture thus obtained, in a second stage, an acidic solution of an aluminium compound and a solution of a source of phosphate ions, and, in a third stage, a precipitating agent to obtain a precipitate, in washing, in a fourth stage, the precipitate thus obtained with water and then with an organic liquid, and in then drying it, in a fifth stage, by distillation until a powder is obtained, and in calcining the powder.

The silicon alcoholate used in the first stage of the particular process for obtaining the support may be any compound in which silicon is bonded to at least one alkoxy group such as an unsubstituted or substituted, saturated or unsaturated, linear, branched or cyclic aromatic or aliphatic alkoxy. The alkoxy groups usually contain from 1 to 20 carbon atoms. Silicon alcoholates containing alkoxy groups of the aliphatic type are especially recommended; those containing alkoxy groups of the unsubstituted saturated aliphatic type are preferred, such as, for example, the methyl, ethyl, n-propyl, isopropyl, n-butyl and isobutyl groups. Silicon alcoholates tetramethylate and tetraisopropylate. Silicon tetraethylate is very particularly preferred. A number of silicon alcoholates may, of course, be used in the first stage of the process according to the invention.

The function of the alcohol used in the first stage of the particular process for obtaining the support is to dissolve the silicon alcoholate. In principle, any alcohol that dissolves the silicon alcoholate and which is water-miscible may be suitable. An alcohol in which the hydrocarbon group may be saturated, unsaturated, aromatic or aliphatic, linear or cyclic, unsubstituted or partially or fully substituted may thus be used. Linear aliphatic alcohols are preferred. Ethanol, isopropanol and methanol may be mentioned as an example. Ethanol is very particularly preferred. It is obvious that a number of alcohols may be used simultaneously in the first stage of the process according to the invention. An alcohol in which the hydrocarbon group corresponds to that of the alkoxy group of the silicon alcoholate employed is preferably employed.

The quantity of alcohol used in the first stage of the particular process for obtaining the support must be sufficient to allow the silicon alcoholate to dissolve completely and consequently depends on the silicon alcoholate and the alcohol that are selected, on the solubility of the silicon alcoholate in the alcohol and on the temperature at which the first stage is performed. In practice there is no advantage in employing a quantity that is much higher than the minimum quantity necessary, because a large excess would entail a pointless dilution of the mixture originating from the first stage, and this is to be avoided.

In a preferred embodiment of the particular process for obtaining the support the first stage is carried out at acidic pH and includes, on the one hand, the addition of water, of the acid, of the silicon alcoholate and of the alcohol, the temperature during the addition being lower than or equal to 30° C., and, on the other hand, maturing the hydrolysis mixture thus obtained at a temperature of at least 20° C. and lower than the boiling temperature of the mixture, so as to replace at least a proportion of the alkoxy groups in the silicon alcoholate with hydroxyl groups, without producing a gelling or precipitation of silica.

The objective of the first stage of the preferred embodiment is (a) to hydrolyse the silicon alcoholate partially in the presence of water and (b) to condense the hydrolysed silicon alcoholate partially, according to the following reactions:

(a) 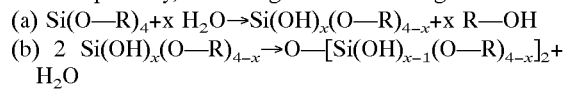

(b) 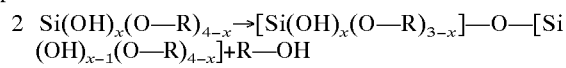

or

2 Si(OH)$_x$(O—R)$_{4-x}$→[Si(OH)$_x$(O—R)$_{3-x}$]—O—[Si(OH)$_{x-1}$(O—R)$_{4-x}$]+R—OH in which R denotes a hydrocarbon radical which may be aromatic or aliphatic, saturated or unsaturated, linear, branched or cyclic, which may optionally be different in the four (O—R) groups, and x denotes a number greater than 0 and smaller than 4, preferably from 0.1 to 3.9. In the first stage a quantity of water is preferably employed such that the molar ratio of this quantity of water to the quantity of silicon used is from 2 to 20, more particularly from 8 to 12, for example approximately 10.

Consequently, the expression "hydrolysed and condensed silicon alcoholate" is intended to denote the compounds O—[Si(OH)$_{x-1}$(O—R)$_{4-x}$]$_2$ and [Si(OH)$_x$(O—R)$_{3-x}$]—O—[Si(OH)$_{x-1}$(O—R)$_{4-x}$] as defined above.

The combined operating condition in the first stage of hydrolysis of the preferred embodiment are advantageously such that any precipitation or gelling of silica in the hydrolysis mixture is avoided. To this end, the mixing in the first stage is carried out in conditions that are specified in relation to the pH and the temperature of the hydrolysis mixture, the molar ratio of the quantities of water and of the silicon alcoholate used and the way in which the reactants are mixed. Hydrolysis mixture is intended to denote the mixture obtained after mixing the water, acid, silicon alcoholate and alcohol. To this end, in the first stage the pH of the hydrolysis mixture is generally lower than 3, preferably from 0.5 to 2.5, for example approximately equal to 1. The acid used in the first stage may be inorganic or organic in nature. It is advantageously chosen from acids which are miscible with water and whose anion is easily removable in a subsequent treatment. It may, for example, be hydrochloric, nitric, phosphoric or sulphuric acid. Hydrochloric acid or nitric acid is preferably employed. Hydrochloric acid is particularly suitable. A number of acids may be optionally used in the first stage of the preferred embodiment. The quantity of acid must be sufficient to keep the pH acidic throughout the duration of the first stage. The quantity of acid consequently depends on the degree of acidity of the acid employed and on the other reactants and on the temperature at which the first stage is carried out. There is no advantage in employing an excessively large quantity of the acid, to avoid having to remove the excess acid or its derivatives in a subsequent stage.

In the first stage of the preferred embodiment it may turn out to be important to mix the reactants in a controlled manner in order to avoid any precipitation or gelling of silica and to prevent the mixture from heating up. To this end, the reactants may be mixed by any suitable known means, provided that the temperature during the addition of the reactants is at most 30° C. and that no precipitation or gelling of silica takes place. The mixing is preferably carried out by adding a premix including the water and the acid to a premix containing the silicon alcoholate and the alcohol. This may be performed by adding the water/acid premix to the alcohol/silicon alcoholate premix. Another method consists in adding the alcohol/silicon alcoholate premix to the water/acid premix. Good results are obtained by adding one of the premixes dropwise to the other premix which is continuously stirred. Particularly satisfactory results are obtained by adding the water/acid premix, dropwise and with stirring, to the alcohol/silicon alcoholate premix.

In the first stage of the preferred embodiment it may turn out to be desirable to keep the temperature during the addition of the reactants lower than 20° C., typically approximately 10° C., temperatures higher than 0° C. being recommended; next, the hydrolysis mixture is subjected to maturing at a temperature of at least 20° C. and lower than the boiling temperature of the mixture, for example from 30° to 100° C., temperatures of 40° to 80° C. being the most common and those from 50° to 70° C. being recommended. The maturing of the hydrolysis mixture is preferably carried out at a temperature which is higher than that for the addition of the reactants.

In the first stage of the preferred embodiment the function of the maturing is to permit a progressive hydrolysis and condensation of the silicon alcoholate according to the reactions defined above. Everything else being equal, the degree of hydrolysis of the alcoholate is proportionally higher (the number x is proportionally larger), the greater the duration of the maturing. The duration of maturing must consequently be sufficient in order that the hydrolysis reaction as described above may take place; it must, however, be shorter than the time required for gelling or precipitation of silica to be produced. The optimum duration of maturing depends on the pH of the hydrolysis mixture, on the nature of the reactants present in the hydrolysis mixture and on the temperature, and may vary from a few minutes to several tens of hours. In general, the duration does not exceed 24 hours. The duration is preferably from 0.5 to 3 hours.

The second stage of the particular process for obtaining the support consists in adding an acidic solution of an aluminium compound and a solution of a source of phosphate ions to the hydrolysis mixture originating from the first stage.

The aluminium compound used in the second stage of the particular process for obtaining the support may be any aluminium compound which is soluble in the acidic solution used in the second stage and which is capable of being precipitated under the effect of a precipitating agent. Inorganic aluminium salts and aluminium alcoholates are especially recommended. Among the aluminium alcoholates, those in which the aluminium is bonded to at least one alkoxy group are usually employed. Among the aluminium alcoholates, those containing aliphatic groups are especially recommended; those containing unsubstituted saturated linear aliphatic groups are preferred, such as, for example, the methyl, ethyl, n-propyl, isopropyl, n-butyl and isobutyl groups. An aluminium alcoholate in which the alkoxy groups contain from 1 to 20 carbon atoms is preferably employed.

Aluminium alcoholates in which the alkoxy group corresponds to that of the silicon alcoholate employed are particularly suitable. Satisfactory results are obtained with inorganic aluminium salts. Among the inorganic aluminium salts, aluminium nitrate and chloride are particularly preferred.

In a particular embodiment, in which an aluminium alcoholate is employed as aluminium compound, the latter may be used, at least partially, in the first stage of the process according to the invention, preferably, if appropriate, in the alcohol/silicon alcoholate premix. The aluminium alcoholate may also be added at the end of the first stage, after the maturing.

For the purpose of the present invention a source of phosphate ions is intended to mean any compound which is soluble in the solution used in the second stage and capable of forming phosphate ions therein. Inorganic phosphate salts [for example monocalcium phosphate of formula $CaH_4(PO_4)_2$, disodium phosphate of formula $Na_2HPO_4$ and tricalcium phosphate of formula $Ca_3(PO_4)_2$], phosphate salt-esters [for example ethyl phosphate of formula $(C_2H_5)_3PO_4$] and phosphoric acid are especially recommended. Phosphoric acid is preferably employed.

The acidic solution of the aluminium compound and the solution of the source of phosphate ions which are used in the second stage of the particular process for obtaining the support may be prepared by any suitable known means and are preferably miscible with the mixture obtained in the first stage of the process according to the invention.

It is obvious that a number of aluminium compounds and/or a number of sources of phosphate ions may be used simultaneously in the second stage.

The total quantities of the aluminium compound and of the source of phosphate ions which are used depend on the desired composition of the support and may vary in a wide measure.

In the second stage of the particular process for obtaining the support it is preferred to operate very slowly to prevent the mixture from heating up, by introducing the mixture of the two solutions dropwise into the mixture, with vigorous stirring, the mixture being thermostatically controlled at a temperature lower than 30° C., typically lower than or equal to 20° C., for example of between 0° and 10° C. throughout the duration of the addition.

The third stage of the particular process for obtaining the support consists in forming a precipitate under the effect of a precipitating agent.

The precipitating agent may be chosen from any compounds capable of causing a coprecipitation of the reactants used in the first and second stage (the hydrolysed and condensed silicon alcoholate originating from the first stage and defined above, the aluminium compound and the source of phosphate ions and optionally the titanium alcoholate) in the form of a mixed oxide of silicon, aluminium and phosphorus and optionally of titanium. Examples of precipitating agent which may be mentioned are ethylene oxide, ammonium carbonate and ammonium hydroxide. An aqueous solution of ammonium hydroxide is preferably employed.

The quantity of precipitating agent used in the third stage of the particular process for obtaining the support is preferably sufficient to permit a complete precipitation of the hydrolysed and condensed silicon alcoholate defined above, of the aluminium compound and of the phosphate compound which are present in the coprecipitation mixture. Coprecipitation mixture is intended to denote the reaction mixture in the course of precipitation in the third stage of the process. The coprecipitation mixture consequently includes the mixture obtained at the end of the second stage of the process according to the invention (including the hydrolysed and condensed silicon alcoholate, the aluminium compound and the source of phosphate ions) and the precipitating agent. The quantity of precipitating agent used is advantageously sufficient to permit a complete coprecipitation of the whole mass of hydrolysed and condensed silicon alcoholate, of aluminium compound and of source of phosphate ions; it is preferably slightly higher than this sufficient quantity.

In the third stage of the particular process for obtaining the support the pH of the coprecipitation mixture is generally higher than or equal to 5, typically higher than or equal to 6; it is usually lower than 11, values lower than 10 being recommended. The pH is preferably kept constant at a value of 6 to 10, for example 8, throughout the duration of the coprecipitation.

In the third stage it may turn out to be advantageous, according to the properties of the support which it is desired to obtain, to control the coprecipitation mixture thermostatically at a temperature lower than or equal to 30° C., preferably at a temperature of 0° to 20° C.

In the fourth stage of the particular process for obtaining the support the washing with water generally consists in suspending the precipitate in a quantity of water which is sufficient to remove at least part of the impurities present in the precipitate and then to remove at least a proportion of this quantity of water by any suitable known means, for example by centrifuging or by filtering. Centrifuging is the preferred method, since it can be carried out rapidly. This washing with water may, of course, be carried out a number of times. The temperature at which this washing is performed has little effect on the effectiveness of the washing and may consequently vary to a large degree. The operation is preferably carried out at ambient temperature.

The precipitate which has been washed with water is next subjected to washing with an organic liquid, for example by dispersing the precipitate in this organic liquid at ambient temperature. The purpose of washing with the organic liquid is to remove at least part of the water which impregnates the precipitate. The organic liquid selected must be at least partially miscible with water, inert towards the precipitate, and yet capable of wetting the precipitate. It has a vaporization temperature which is preferably lower than 120° C., typically lower than 100° C., for example from 70° to 90° C. Organic liquids that can be employed in this washing are alcohols, ethers or their mixtures. Alcohols are preferred, particularly those containing from 1 to 4 carbon atoms. Isopropanol is suitable. This washing with an organic liquid may, of course, be repeated a number of times and a number of organic liquids may be used simultaneously. At the end of the washing it is desirable to separate the precipitate from at least part of the water and of the organic liquid employed, by centrifuging or by filtering.

In a fifth stage of the particular process for obtaining the support the washed precipitate is next subjected to drying by distillation in order to evaporate off the water and the organic liquid not removed previously, until the powdered support is obtained. The distillation may be performed at atmospheric pressure or at reduced pressure. The operation is preferably carried out at atmospheric pressure.

In a particular alternative form an organic liquid which forms an azeotrope with water is selected for washing the precipitate and, during the drying, the azeotrope is first distilled off until At least 95%, preferably at least 98%, of the water and part of the organic liquid have been removed and the residue of the organic liquid which is still present in the precipitate is then distilled off. Depending on the quantity of water present in the precipitate after the washing, it is sometimes necessary in this particular embodiment to add an additional quantity of the organic liquid to the washed precipitate to permit a maximum removal of the water in the form of the water/organic liquid azeotropic mixture. In this particular embodiment a powder with a moisture content generally lower than 1% by weight, preferably lower than 0.5% by weight, for example lower than 0.2% by weight, is obtained when the drying is finished.

At the end of the drying by distillation a powdered support is collected which may be optionally screened in order to separate from it the particles of undesired size. This powder is subjected to a calcination. The purpose of the calcining is to extract the organic impurities from the powder at elevated temperature. It is generally continued until the weight of the powder remains constant with time, while avoiding crystallization of the powder. The calcining may be performed under air (preferably under dry air) in a fluidized bed at a temperature which is lower than the crystallization temperature of the powder. The temperature is generally from 300° to 1500° C., typically from 350° to 1000° C., preferably from 400° to 600° C.

In a first embodiment of the particular process for obtaining the support, the latter is obtained by additionally using, in the first or in the second stage, an alcoholate of a transition metal of groups IVB or VB of the Periodic Table (such as titanium, zirconium or vanadium) or an alcoholate of an element of group IIIA of the Periodic Table other than aluminium (such as boron) or else an organic or inorganic salt of these elements. Alcoholates are preferred, in particular those of titanium. The alcoholate may be, for example, a compound containing at least one alkoxy group such as an unsubstituted or substituted, saturated or unsaturated, linear, branched or cyclic aliphatic or aromatic alkoxy. The alkoxy groups usually contain from 1 to 20 carbon atoms. The alcoholate is preferably soluble is the hydrolysis mixture. Titanium acetylacetonate is particularly suitable.

A number of alcoholates and/or salts may, of course, be used. The alcoholate or the salt may optionally be used in the form of a solution in a liquid hydrocarbon, such as an alcohol.

The quantity of alcoholate or of salt used in the first embodiment is generally such that the transition metal or the element of group IIIA is present in the support in a proportion varying from 0.05 to 20% by weight, preferably from 0.1 to 15% by weight, more particularly from 0.5 to 10% by weight based on the total weight of the support.

In the first embodiment the alcoholate or the salt may be used at any time in the first or the second stage. For example, the alcoholate or the salt may be added to the premix including the water and the acid or to the premix containing the silicon alcoholate and the alcohol. Alternatively, the alcoholate or the salt may be added to the hydrolysis mixture obtained after mixing the water, the acid, the silicon alcoholate and the alcohol, before, during or after the maturing. Good results are obtained when the alcoholate or the salt is added during the maturing. It is recommended to add the alcoholate or the salt after a first part of the maturing, which advantageously represents from 40 to 60%, for example approximately 50 %, of the total duration of the maturing, the second part being performed after the addition of the alcoholate or salt.

The first embodiment is found to be especially advantageous when it is desired to incorporate the titanium into the support in a high quantity which may range up to 20% by weight of the total weight of the support, while avoiding, in a subsequent stage, the formation of agglomerates of crystalline titanium dioxide in the anatase or rutile form.

In a second embodiment of the particular process for obtaining the support the precipitate originating from the third stage is subjected to maturing. The latter is carried out in a maturing mixture which may be the coprecipitation mixture collected from the third stage, optionally with stirring. An inert compound which modifies the pH of the maturing mixture, for example a basic compound, may be added thereto. Alternatively, the precipitate is first isolated from the coprecipitation mixture, for example by centrifuging, and then resuspended in an inert liquid such as water or an alcohol to perform the maturing. This alternative form has the advantage of removing part of the ionic impurities adsorbed in the precipitate and originating from the reactants used when the precipitate is manufactured.

The purpose of the maturing is to prolong the coprecipitation and thus to modify the specific surface and the pore volume of the precipitate. It is usually performed at a temperature which may vary from the ambient temperature to the boiling temperature of the maturing mixture. The operation is preferably carried out at approximately 20° C. The period of maturing depends on the temperature and the properties (specific surface and pore volume) which are required for the support. It may therefore vary from a few minutes to several tens of hours. The best results are obtained with a period of at least one hour. Because of economic considerations there is no advantage in prolonging the maturing beyond 48 hours. The maturing is generally performed at a pH higher than or equal to 6, preferably from 8 to 10.

In a third embodiment of the particular process for obtaining the support the precipitate obtained in the above-mentioned third stage is subjected to grinding and then to being suspended in a liquid, followed by pulverizing of the suspension of the precipitate in droplet form. The liquid employed may be any dispersant that is inert towards the precipitate, for example water. The particles collected from the pulverizing are then subjected successively to washing with water and with an organic liquid, to drying by distillation and to calcining, as described above. Alternatively, the pulverizing may be performed after the washing with water.

The catalytic solid according to the invention may be obtained in a manner known per se by impregnating the powdered support with an aqueous or organic solution of a chromium compound, followed by drying in an oxidizing atmosphere. A chromium compound chosen from the soluble salts, such as the oxides, the acetate, the chloride, the sulphate, the chromate and the dichromate in aqueous solution, or such as the acetylacetonate in organic solution, may be employed for this purpose. After the impregnation of the support with the chromium compound the impregnated support is usually activated by being heated to a temperature of 400° to 1000° C. to convert at least part of the chromium into hexavalent chromium.

The catalytic solid according to the invention may also be obtained by means of mechanical mixing of the powdered support with a solid chromium compound, for example chromium acetylacetonate. This mixture may next be pre-activated at a temperature which is lower than the melting temperature of the chromium compound before being conventionally activated as described above.

Alternatively, the chromium compound may also be incorporated into the powdered support during the manufacture of the latter or during the manufacture of the precipitate. For this purpose it may, for example, be added, partly, or completely, to the acidic solution of the aluminium compound and of the source of phosphate ions which is used in the second stage of the process according to the invention, so as to coprecipitate the mixed chromium oxide simultaneously with the mixed silicon, aluminium and phosphorus oxide. The chromium compound may also be added to the precipitate before or after the maturing of the latter.

In the catalytic solid according to the invention the chromium is generally present in a proportion varying from 0.05 to 10% by weight, preferably from 0.1 to 5% by weight, more particularly from 0.25 to 2% by weight of chromium based on the total weight of the catalytic solid.

The catalytic solid preferably does not contain any organometallic compounds, in particular organoaluminium compounds or any derivatives of the latter.

The catalyst system according to the invention may be employed for the homopolymerization of olefins containing from 2 to 8 carbon atoms per molecule. These olefins are preferably chosen from ethylene, propylene, 1-butene, 1-pentene, 3-methyl-1-butene, 1-hexene, 3- and 4-methyl-1-pentenes and 1-octene. Ethylene and propylene are suitable. The preferred homopolymers are those of ethylene.

When employed for the homopolymerization of olefins, the catalyst system according to the invention has the advantage of offering homopolymers of lower density when compared with a homopolymerization process performed in the same conditions but in the absence of cocatalyst.

The catalyst system according to the invention may also be employed for the copolymerization of olefins containing from 2 to 8 carbon atoms with one or more comonomers. The comonomers may be chosen from the olefins described above and diolefins containing from 4 to 18 carbon atoms. The diolefins may be chosen from unconjugated aliphatic diolefins such as 4-vinylcyclohexene or alicyclic diolefins which have an endocyclic bridge, such as dicyclopentadiene, methylene- and ethylidenenorbornene and conjugated aliphatic diolefins such as 1,3-butadiene, isoprene and 1,3-pentadiene. Copolymers of the ethylene with one or more comonomers are preferred, in particular those containing at least 90%, more precisely at least 95% by weight of ethylene. The preferred common ,-rs of ethylene are propylene, 1-butene, 1-hexene and 1-octene. 1-Butene and/or 1-hexene give the best results.

When employed for the copolymerization of olefins with one or more comonomers, the catalyst system according to the invention has the advantage of providing copolymers of lower density when compared with a copolymerization process performed in the same conditions (and in particular when using an identical comonomer content) but in the absence of cocatalyst.

The invention consequently also relates to a process for the polymerization of olefins such as defined above, using a catalyst system in accordance with the invention. It relates more particularly to such a process as applied to the homopolymerization of ethylene or else to the copolymerization of ethylene with hexene and/or butene.

In the polymerization process according to the invention the polymerization may be performed equally well in solution, in suspension in a hydrocarbon diluent or else in gaseous phase. Good results are obtained in polymerizations in suspension.

The polymerization in suspension is carried out in a hydrocarbon diluent such as liquid aliphatic, cycloaliphatic and aromatic hydrocarbons at a temperature such that at least 80% (preferably at least 90%) of the polymer formed is insoluble therein. The preferred diluents are linear alkanes such as n-butane, n-hexane and n-heptane or branched alkanes such as isobutane, isopentane, isooctane and 2,2-dimethylpropane, or cycloalkanes such as cyclopentane and cyclohexa , or mixtures thereof.

The quantity of organoaluminium compound used in the polymerization process according to the invention is generally such that the molar ratio of aluminium to chromium is at least 0.1, in particular at least 0.5, ratios of at least 1 being favorable. The molar ratio of aluminium to chromium is usually not more than 100, more precisely not more than 20, ratios of not more than 10 being recommended.

The polymerization temperature is generally chosen between 20° and 200° C., preferably between 50° and 150° C., in particular between 80° and 115° The ethylene pressure is chosen in most cases between the atmospheric pressure and 5 MPa, preferably between 0.4 and 2 MPa, more particularly between 0.6 and 1.5 MPa.

The polymerization may be performed continuously or noncontinuously, in a single reactor or in several reactors arranged in series, the polymerization conditions (temperature, optional comonomer content, optional hydrogen content, type of polymerization medium) in one reactor being different from those employed in the other reactors.

In the polymerization process according to the invention the catalytic solid and the cocatalyst are advantageously used without having been premixed.

The polyolefins obtained by means of the polymerization process according to the invention generally have a density of at least 0.930 g/cm$^3$, in particular of at least 0.935 g/cm$^3$, values of at least 0.940 g/cm$^3$ being preferred. In most cases the density is not more than 0.960 g/cm$^3$, more precisely not more than 0.955 g/cm$^3$, densities of not more than 0.950 g/cm$^3$ being the most common ones.

EXAMPLES

Examples 1 to 3, the description of which follows, are used to illustrate the invention. Examples 1 and 2 are in accordance with the invention. In these examples a catalyst system has been prepared which has subsequently been employed for the suspension copolymerization of ethylene with hexene. Example 3 is given by way of comparison. The meaning of the symbols employed expressing the properties which are mentioned and the methods for measuring these properties are detailed below.

SS=specific surface of the support, measured by the nitrogen penetration method according to the volumetric method of British Standard BS 4359/1 (1984).

PV=pore volume of the support, equal to the sum of the pore volume consisting of pores of radius smaller than or equal to 75 Å, measured by the nitrogen penetration method according to the volumetric method of British Standard BS 4359/1 (1984) and of the pore volume measured by the mercury penetration method by means of the porosimeter of the Poro 2000 type marketed by Carlo Erba Co, according to Belgian Standard NBN B 05-202 (1976).

HLMI=melt index of the molten polyethylene at 190° C., measured under a load of 21.6 kg and expressed in g/10 min, according to ASTM standard D 1238 (1986).

$\mu$=dynamic viscosity of the polyethylene, expressed in dPa s and measured at a rate gradient of 100 s$^{-1}$ and at 190° C.

SD=standard mass per unit volume (or density) of the polyethylene, expressed in kg/m$^3$ and measured according to ISO standard 1183 (1987).

Examples 1 and 2 (in accordance with the invention)

A. Preparation of a Support a) First stage (hydrolysis)

A solution of water and of 1M hydrochloric acid was added dropwise to a solution of silicon tetraethylate and of ethanol, thermostatted at 10° C., so as to obtain an H$^+$concentration of 0.1M. The quantities of silicon tetraethylate, ethanol, water and hydrochloric acid which were used are shown in Table I. The hydrolysis mixture thus obtained was next subjected to maturing for 2 hours at 60° C.

b) Second stage

An aqueous solution containing aluminium chloride hydrate and phosphoric acid was prepared, the quantities used being shown in Table I. The solution thus obtained was next added to the hydrolysis mixture obtained in (a), with vigorous stirring at 10° C.

c) Third stage (coprecipitation)

The mixture obtained in (b) was added to 500 g of an aqueous solution of ammonium hydroxide of pH 8 thermostatted at 10° C., while the pH was kept constant at a value of 8, in order to perform a precipitation.

d) Maturing

The precipitate obtained in (c) was subjected to maturing at pH 8 for 2 hours with gentle stirring at 60° C.

e) Fourth stage (washing)

The precipitation obtained in (d) was washed, firstly three times with water, then once with isopropanol.

f) Fifth stage (drying)

The washed precipitate obtained in (e) was subjected to distillation of the water-isopropanol azeotrope at ambient pressure and then of isoproparol, first at ambient pressure and then at reduced pressure, so as to obtain a powder whose moisture content is lower than 1% by weight.

g) Calcining

The powder obtained in (f) was calcined in a fluidized bed, purged with dry air, for 4 hours at 500° C. A powder of a support was collected, whose composition (mol % of silica, of alumina and of aluminium phosphate), specific surface, pore volume and crystallization temperature are shown in Table I.

TABLE I

| First stage: | |
|---|---|
| quantity used of: | |
| silicon tetraethylate (g) | 34.6 |
| ethanol (g) | 41.6 |
| water (g) | 18.9 |
| 1M hydrochloric acid (g) | 12.0 |
| Second stage: | |
| quantity used of: | |
| AlCl$_3$.6H$_2$O (g) | 40.1 |

TABLE I-continued

| | | |
|---|---|---|
| 85% phosphoric acid (g) | | 14.3 |
| water (g) | | 33.3 |
| Support obtained: | | |
| composition: | SiO$_2$ (mol %) | 54.2 |
| | Al$_2$O$_3$ (mol %) | 10.8 |
| | AlPO$_4$ (mol %) | 35.0 |
| SS (M$^2$/g) | | 307 |
| PV (cm$^3$/g) | | 2.33 |

B. Preparation of a Catalytic Solid

The support obtained in A was mixed with chromium acetylacetonate in a quantity such as to make the mixture contain 1% by weight of chromium. The mixture thus obtained was then treated in a fluidized bed at 150° C. for 2 hours under dry air purging. It was next calcined in the fluidized bed at 700° C. for 5 hours under dry air and the catalytic solid was collected.

C. Polymerization of Ethylene

The conditions in which the polymerization was performed are collated in Table II.

Into a 3-litre autoclave, predried and fitted with a stirrer, were introduced x mg of the catalytic solid obtained in B, y ml of a solution of triethylaluminium at a concentration of 40 g/l and 1 litre of isobutane. The temperature was raised to T° C. and ethylene was introduced into the autoclave at a partial pressure of p MPa. An initial quantity of m g of hexene was introduced. Additional quantities of hexene were added during the polymerization so as to keep the ethylene/hexene molar ratio constant in the autoclave. The total quantity of hexene introduced was n g. The ethylene pressure and the temperature were kept constant during the time needed to produce a defined quantity of polyethylene. After degassing, the polymer was recovered in the form of particles, the properties of which are listed together in Table II.

TABLE II

| Example | 1 | 2 |
|---|---|---|
| x | 154 | 166 |
| y | 0.2 | 0.2 |
| T | 102 | 104 |
| p | 0.75 | 0.75 |
| m | 2 | 1.5 |
| n | 3 | 2.3 |
| HLMI | 24 | 31 |
| SD | 0.946 | 0.942 |
| μ | 19000 | 18000 |

Example 3 (given by way of comparison)

In this example ethylene was copolymerized in conditions which were similar to Example 1 and 2 with the exception of the cocatalyst, which was omitted.

A. Preparation of a Catalytic Solid

The catalytic solid of Examples 1 and 2 was employed.

B. Polymerization of Ethylene

The operations of Example 1.C were repeated in the conditions stated in Table III, with the exception of the cocatalyst. The properties of the copolymer obtained are listed together in Table III.

TABLE III

| Example | 3 |
|---|---|
| x | 160 |
| y | 0 |
| T | 104 |
| p | 0.75 |
| m | 2 |
| n | 3.4 |
| HLMI | 13.8 |
| SD | 0.959 |
| μ | 21000 |

Comparison of the result of Example 3 with that of Examples 1 and 2 shows the progress provided by the invention, namely that the presence of an organoaluminium compound as cocatalyst makes it possible to obtain lower densities.

Examples 4 and 5 (in accordance with the invention)

In these examples a catalyst system according to the invention was employed for the homopolymerization of ethylene, optionally in the presence of hydrogen (Example 5).

A. Preparation of a Support

The operations of Example 1.A were repeated in conditions which were regulated to obtain a support whose characteristics were the following:

composition:
  SiO$_2$ (mol %): 50.4
  Al$_2$O$_3$ (mol %): 1.8
  AlPO$_4$ (mol %): 47.8
  SS (m$^2$/g): 293
  PV (cm$^3$/g): 3.17

B. Preparation of a Catalytic Solid

The operations of Example 1. B were repeated.

C. Homopolymerization of Ethylene

The operations of Example 1. C were repeated in the conditions stated in Table IV.

In Example 5 hydrogen was also introduced into the autoclave at a partial pressure of 0.9 MPa.

The properties of the homopolymer obtained are also listed together in Table IV.

TABLE IV

| Examples | 4 | 5 |
|---|---|---|
| x | 151 | 134 |
| y | 0.2 | 0.2 |
| T | 102 | 95 |
| p | 0.75 | 0.75 |
| m | 0 | 0 |
| n | 0 | 0 |
| HLMI | 29 | 159 |
| SD | 0.942 | 0.946 |
| μ | 14100 | 8200 |

What is claimed is:

1. A catalyst system for olefin polymerization, including a catalytic solid based on chromium deposited on a coprecipitated support simultaneously containing silica, alumina and aluminium phosphate and a cocatalyst selected from the group consisting of organoaluminium compounds.

2. The catalyst system according to claim 1, in which the organoaluminium compound corresponds to the formula AlR$_{3-n-m}$(OR')$_n$X$_m$ in which R and R' are identical or different and each denotes a hydrocarbon radical, X denotes a halogen and n and m denote numbers such that $0 \leq n < 3$ and $0 \leq m < 3$.

3. The catalyst system according to claim 2, in which n and m are 0.

4. The catalyst system according to claim 3, in which R is a radical selected from the group consisting of alkyl (linear or branched), cycloalkyl, arylalkyl, aryl and alkylaryl radicals containing up to 20 carbon atoms.

5. The catalyst system according to claim 4, in which the organoaluminium compound is triethylaluminium.

6. The catalyst system according to claim 1, in which the catalytic solid contains from 0.05 to 10% by weight of chromium based on the total weight of the catalytic solid.

7. The catalyst system according to claim 1, in which the support contains silica (X), alumina (Y) and aluminium phosphate (Z) in a molar percentage (X):(Y):(Z) of (10 to 95):(1 to 80):(1 to 85).

8. The catalyst support system according to claim 7, wherein said molar percentage (X):(Y):(Z) is (20 to 80):(1 to 60):(5 to 60).

9. The catalyst system according to claim 1, in which the support additionally contains titanium in a quantity, expressed as a molar percentage of $TiO_2$ relative to the support of the catalytic solid, of 0.1 to 40 mol %.

10. The catalyst system according to claim 1, in which the support has a specific surface of 100 to 800 $m^2/g$, a crystallization temperature of at least 700° C., a pore volume of 1.5 to 5 $cm^3/g$ and a standard density of 50 to 500 $kg/m^3$.

11. The catalyst system according to claim 10, in which the specific surface (SS) and the pore volume (PV) correspond to the following relationship $$SS<(PV\times564-358)$$

in which SS and PV denote, respectively, the numerical values of the specific surface expressed in $m^2/g$ and of the pore volume expressed in $cm^3/g$.

12. The catalytic system according to claim 10, wherein said pore volume is from 2 to 5 $cm^3/g$.

13. The catalyst system according to claim 1, wherein the coprecipitated support is prepared by mixing, in a first stage, an alcohol, water, a silicon alcoholate and an acid in quantities such that the water/silicon molar ratio is from 2 to 50, to obtain a hydrolysis mixture adding to the hydrolysis mixture thus obtained, in a second stage, an acidic solution of an aluminium compound and a solution of a source of phosphate ions, in a third stage, adding a precipitating agent to obtain a precipitate, washing, in a fourth stage, the precipitate thus obtained with water and then with an organic liquid, and drying said precipitate, in a fifth stage, by distillation until a powder is obtained, and by calcining the powder.

14. The catalyst system according to claim 13, in which the first stage of preparing the coprecipitated support is carried out at acidic pH and includes, the addition of water, of the acid, of the silicon alcoholate and of the alcohol, the temperature during the addition being lower than or equal to 30° C., and, also includes maturing the hydrolysis mixture thus obtained at a temperature of at least 20° C. and lower than the boiling temperature of the mixture, so as to replace at least a proportion of the alkoxy groups of the silicon alcoholate with hydroxyl groups without producing a precipitation or gelling of silica.

15. A catalyst system for olefin polymerization, including a catalytic solid based on chromium deposited on a support simultaneously containing silica (X), alumina (Y) and aluminum phosphate (Z) in a molar percentage (X):(Y):(Z) of (10 to 95):(1 to 80):(1 to 85) and a cocatalyst of the formula $AlR_{3-n-m}(OR')_nX_m$ in which R is selected from the group consisting of alkyl (linear or branched), cyclo alkyl, aryl alkyl, aryl, and alkyl aryl radicals containing up to 20 carbon atoms, X denotes a halogen and n and m denotes numbers such that $0\leq n<3$ and $0\leq m<3$.

16. The catalyst system for olefin polymerization according to claim 15, wherein said support has a specific surface area from 100 to 800 $m^2/g$, a crystallization temperature of at least 700° C., a pore volume from 2 to 5 $cm^3/g$, and a standard density from 50 to 500 $kg/m^3$.

17. The catalytic system according to claim 16, in which the specific surface area (SS) and the pore volume (PP) correspond to the following relation $$SS<(VP\times564-358)$$

in which SS and VP respectively designate the numerical values of the specific surface area expressed in $m^2/g$ and the pore volume expressed in $cm^3/g$.

18. A process for the polymerization of at least one olefin by means of the catalyst system in accordance with claim 1.

19. The polymerization process according to claim 18, applied to the homopolymerization of ethylene.

20. The polymerization process according to claim 18, applied to the copolymerization of ethylene with hexene and/or butene.

* * * * *

UNITED STATES PATENT AND TRADEMARK OFFICE
CERTIFICATE OF CORRECTION

PATENT NO. : 5,863,854
DATED : January 26, 1999
INVENTOR(S) : Abel Grosjean et al.

It is certified that error appears in the above-identified patent and that said Letters Patent is hereby corrected as shown below:

On the title page: Item [*] Notice: The term of this patent shall not extend beyond the expiration date of Patent No. 5,849,852. --

Signed and Sealed this

Twenty-seventh Day of July, 1999

Attest:

Q. TODD DICKINSON

*Attesting Officer*  *Acting Commissioner of Patents and Trademarks*